United States Patent

Hirayama

[11] Patent Number: 5,854,999
[45] Date of Patent: Dec. 29, 1998

[54] METHOD AND SYSTEM FOR SPEECH RECOGNITION WITH COMPENSATION FOR VARIATIONS IN THE SPEECH ENVIRONMENT

[75] Inventor: Hiroshi Hirayama, Tokyo, Japan

[73] Assignee: NEC Corporation, Tokyo, Japan

[21] Appl. No.: 669,239

[22] Filed: Jun. 24, 1996

[30] Foreign Application Priority Data

Jun. 23, 1995 [JP] Japan ..................................... 7-180734

[51] Int. Cl.$^6$ ....................................................... G01L 5/06
[52] U.S. Cl. ........................ 704/226; 704/233; 704/241; 704/243; 704/245
[58] Field of Search ................................ 395/2.35, 2.37, 395/2.42, 2.5, 2.52, 2.54, 2.65; 704/226, 228, 233, 241, 243, 245, 256

[56] References Cited

FOREIGN PATENT DOCUMENTS

| 0 301 199 | 2/1989 | European Pat. Off. . |
| 0 660 300 | 6/1995 | European Pat. Off. . |
| 0 701 245 | 3/1996 | European Pat. Off. . |
| 7-191689 | 7/1995 | Japan . |

OTHER PUBLICATIONS

Takagi et al., "Rapid Environment Adaptation for Speech Recognition", J. Acoust. Soc. Jpn. (E), vol. 16, No. 5, (1995) pp. 273–281.

*Primary Examiner*—David R. Hudspeth
*Assistant Examiner*—Susan Wieland
*Attorney, Agent, or Firm*—Foley & Lardner

[57] ABSTRACT

Compensatory values for compensating a reference pattern to match with an utterance environment of an input speech are employed for determining an environmental variation index to be input to a secondary matching controller, which is responsible for magnitudes of the index smaller than a threshold to hold a second matching section inoperative so that a recognition result of a primary matching of a previous compensated reference pattern is output, and for magnitudes of the index larger than the threshold to operate the second matching section to output a recognition result of a second matching based on a current compensated reference pattern to be stored as a subsequent reference pattern.

8 Claims, 7 Drawing Sheets

METHOD AND SYSTEM FOR SPEECH RECOGNITION WITH COMPENSATION FOR VARIATIONS IN THE SPEECH ENVIRONMENT

BACKGROUND OF THE INVENTION

The present invention relates generally to a method and a system for recognizing an uttered speech as a significant word or a sequence of significant words, and particularly, to a speech recognition method and a speech recognition system for responding to an input speech representative of an uttered speech in a variable utterance environment, to recognize the input speech as a corresponding one or a sequence of corresponding ones of reference words in a stored dictionary, with a reduced response time for recognition (hereafter "recognition time") in consideration of a variation of the utterance environment, whereas the input speech and the reference words are converted into a so-called input pattern and reference patterns in a character vector field such as a spectral vector field, respectively, for a comparison therebetween to check for a most likely word or a sequence of most likely words.

DESCRIPTION OF THE RELATED ART

The last decade observed some epochal developments in the speech recognition field, in which recognition of speech is implemented by an algorithm to determine such one of stored references and/or possible combinations thereof, that is most likely to correspond to the speech in terms of a distance in a character vector field defined by a few tens of character parameters in accordance with an employed mathematical model.

FIG. 1 illustrates an i–j trellis plane for a fundamental speech recognition concept using a well-known dynamic programming (hereafter "DP") matching algorithm.

According to this concept, an input signal representative of a speech is divided into I (I=variable integer) frames, to be analyzed for a conversion into an input pattern V composed of a temporal sequence of a total of I frame-mode character vectors $v_i$ (i=1~I), such that:

$$V = v_1, v_2, \ldots, v_i, \ldots, v_I \qquad (1).$$

The input pattern V is elementwise compared with a set $\Sigma(=\{W^n; n\text{ (suffix)}=1\sim N\text{ (predetermined integer)}\})$ of a total of N ordered reference words $W^n$ each respectively composed of a basic reference pattern consisting of a sequence of a total of $K^n$ ($K^n$=preset integer) frame-mode reference vectors $W^n_k$ (k=1~$K^n$) such that:

$$W^n = w^n_1, w^n_2, \ldots, w^n_k, \ldots, w^n_{K^n} \qquad (2),$$

and hence the set $\Sigma$ comprises a collective reference pattern W composed of a sequence of numbered reference vectors $w_j$ (j=1~J; J=total sum of $K^n$ for N words $W^n$), such that:

$$W = w_1 \cdot w_2 \cdot w_3 \cdot \ldots, w_j, \ldots, w_{J1}(=w^1_{K^1}), \qquad (30)$$
$$w_{(J1)+1}, w_{(J1)+2}, \ldots w_{J2}(=w^2_{K^2}),$$
$$\ldots,$$
$$w_{J(n-1)+1}, w_{J(n-1)+2}, \ldots, w_{Jn}(=w^n_{K^n}),$$
$$\ldots,$$
$$w_{J(N-2)+1}, w_{J(N-2)+2}, \ldots, w_{J(N-1)};$$
$$w_{J(N-1)+1}, w_{J(N-1)+2}, \ldots, w_J(=w^N_{K^N}).$$

The comparison follows a DP-matching algorithm to determine a total of N distances $D(V, W^n)$, such that:

$$D(V, W^n) = g(I, K^n) \qquad (4),$$

where, $g(I, K^n)$ is a cumulative distance from a word-mode start point (1,j; j=$J_{(n-1)}$+1) to a word-mode end point (I,j; j=$J_n$) by a recurrence formula $g(i,j)$ defined on the i–j plane, e.g. such that:

$$g(i,j) = d(i,j) + \min[G] \qquad (5)$$

for $$G = \{g(i-1, j), g(i-1, j-1)\} \qquad (6),$$

where, $d(i,j)$ is a euclidean distance between vectors $v_i$ and $w_j$, and min[G] means a minimal one in a set G of elements $g(i-1, j)$ and $g(i-1, j-1)$ representative of recursive routes, respectively, providing initial conditions such that:

$$g(1,j; j=J_{(n-1)}+1) = d(1, 1) \qquad (7),$$

$$g(1,j; j \neq J_{(n-1)}+1) = \infty \qquad (8)$$

and $$g(i, 0) = \infty \qquad (9).$$

Typically, such cumulation is continuously repeated via respective trellis points (i,j) in possible routes from an initial point (1,1) to a final point (I,J), as illustrated in FIG. 1 for particular integers p and q. Accordingly, the respective basic reference patterns of words $W^n$ and N distances $D(V, W^n)$ are commonly represented by W and D(V,W) for brevity, respectively, which indicate $\{W^n\}$ and g(I, J) also, respectively, as circumstances require. The distinction should be clear for artisans from an associated context.

In a typical calculation, each time when a character vector $v_p$ of any p-th frame is determined, a provisional cumulation $g(p,j)$ is promptly performed for all the J points (p,j) at i=p, before results of the cumulation are stored to permit an immediate recognition after an utterance of a speech. For each frame-mode character vector $v_i$ (i=1~I), the cumulation results are accessed J times respectively for read and write.

Like this, the DP matching provides a defined correspondence between an input pattern and a set of reference patterns.

There is another fundamental speech recognition concept based on a well-known hidden Markov model (hereafter "HMM"), in which respective words or phonemes have their Markov models each composed as a transition graph of a few stochastic status, to be investigated as to which model has a maximum likelihood for generation of an input speech.

In accordance with one of such fundamental concepts, a typical conventional speech recognition system has been adapted for a comparison between a set of reference patterns representative of characters of reference words as objects of recognition based on reference voices and an input pattern representative of characters of an uttered speech to determine a set of relative distances therebetween, before outputting a recognition result such as an identification number representative of a recognition object of which the distance is a minimum.

The speech recognition performance tends to be degraded with variations of an utterance environment such as a background state or a microphone characteristic.

To overcome such problem, there has been proposed a speech recognition system in Japanese Patent Application Laid-Open Publication No. 7-191689.

This conventional speech recognition system estimates variations in utterance environment including a set of additive noise components such as background components concurrently mixed with an uttered speech, additively acting thereon in a spectral field, and magnitudes of a set of distortion factors such as microphone or telephone channel's transmission characteristics multiplicatively acting on the uttered speech, causing spectral components thereof to be distorted, and determines a set of compensatory values for effecting a compensation with respect to the noise components and the distortion factors so that an input pattern and a set of reference patterns are compensated either to the other for a match of utterance environment therebetween.

FIG. 2 is a block diagram of an essential part of the conventional speech recognition system.

As shown in FIG. 2, an uttered speech in a variable utterance environment is input to an analyzer 91, where it is analyzed to be converted into an input pattern V consisting of a temporal sequence of character vectors representative of acoustic or phonetic characters of the input speech.

The input pattern V is input to a preliminary matching section 92, which has a set of reference patterns W read therein from a reference pattern memory 93.

At the preliminary matching section 92, the input pattern V and the set of reference patterns W have their temporal axes normalized, so that they are defined on a normalized temporal axis for a calculation to determine a set of distances therebetween, a minimum one of which is then selected to provide a correspondence relation T between a temporal sequence of character vectors of the selected pattern and that of character vectors of the input pattern V, as they are defined on the normalized temporal axis.

The correspondence relation T as well as the input pattern V is provided to a compensatory value calculator 94, which also has the set of reference patterns W read therein from the reference pattern memory 93.

The compensatory value calculator 94 is responsible for the combination of input pattern V, reference patterns W and correspondence relation T therebetween to determine a set of compensatory values C for a compensation of the reference patterns W with respect to a set of additive noise components additively operative in a spectral vector field and a set of distortion factors multiplicatively operative therein.

The set of compensatory values C as well as the input pattern V and reference patterns W is input to a pattern compensating section 95, which is responsive thereto for compensating the reference patterns W to provide a set of compensated patterns Wa of whole objects of recognition.

The set of compensated patterns Wa as well as the input pattern V is input to a matching section 96, where the patterns V and Wa have their temporal axes normalized, so that they are defined anew on a normalized temporal axis for a calculation to determine a set of distances therebetween, a minimum one of which is then selected to output a recognition result R as an identification number representative of one of the recognition objects corresponding to the selected pattern.

There will be mathematically discussed below the calculation of compensatory values and the compensation of character patterns in a spectral vector field.

Letting Bv be a vector representative of a set of additive noise components in an utterance environment of the uttered speech and Av be a vector representative of a set of distortion factors due to the environment, the input pattern V(t) at a time t can be expressed such that:

$$V(t)=Av \cdot Vo(t)+Bv \tag{10}$$

for t during an utterance interval, and $$V(t)=Bv \tag{11}$$

for t during a noise interval, where Vo(t) is a true spectral character vector of the uttered speech at the time t, and "·" is an operator for multiplying a respective component of a vector at the rear side by a corresponding component of a vector at the front side.

Likewise, letting Bw be a vector representative of a set of additive noise components in an utterance environment of a word as a recognition object and Aw be a vector representative of a set of distortion factors due to the environment, a corresponding reference pattern W(t) at the time t can be expressed such that:

$$W(t)=Aw \cdot Wo(t)+Bw \tag{12}$$

for t during an utterance interval, and $$W(t)=Bw \tag{13}$$

for t during a noise interval, where Wo(t) is a true spectral character vector of the recognition object, as it is uttered at the time t.

On the other hand, the compensated reference pattern Wa(t) at the time t is assumed to be representative of a recognition object in the utterance environment of the uttered speech, such that:

$$Wa(t)=Av \cdot Wo(t)+Bv \tag{14}$$

for t during the utterance interval, and $$Wa(t)=Bv \tag{15}$$

for t during the noise interval.

Using expression (12), Wo(t) of expression (14) can be eliminated such that:

$$Wa(t)=(Av/Aw) \cdot \{W(t)-Bw\}+Bv \tag{16},$$

where "/" is an operator for dividing a respective component of a vector at the front side by a corresponding component of a vector at the rear side.

In this connection, letting Sv and Nv be an average power level over utterance intervals and an average power level over noise intervals at a respective spectral component of the input pattern V, respectively, and Sw and Nw be those at a corresponding spectral component of the reference patterns W, respectively, and assuming that an average power level at a respective spectral component of a true pattern of the input pattern V be approximately equivalent to an average power level at a corresponding spectral component of a true pattern of the reference patterns W, the compensatory values C can be componentwise reduced from expressions (10) and (15), such that:

$$Av/Aw=(Sv-Nv)/(Sw-Nw) \tag{17},$$

$$Bv=Nv \tag{18}$$

and $$Bw=Nw \tag{19},$$

where Av/Aw is a distortion ratio vector, Bv is an additive noise vector of the input pattern V, and Bw is an additive noise vector of the reference patterns W.

Therefore, by use of the compensatory values C determined from expressions (17) to (19), processes of expressions (15) and (16) can be executed to compensate differences between the input pattern V and the reference patterns W.

FIG. 3 is a time chart of actions of the conventional speech recognition system of FIG. 2.

As shown in FIG. 3, the conventional speech recognition system has been implemented for a combination of a preliminary first matching and an unavoidable second matching that has to be executed after completion of an utterance, thus needing a relatively long recognition time from an utterance end to an output of a recognition result.

To reduce the recognition time, the conventional system is adapted to be operative for holding the compensated reference patterns Wa for use in recognition of a subsequent input speech so that the subsequent speech recognition can be achieved without a compensation of reference patterns W, i.e. simply by a combination of an analysis at the analyzer 91 for a conversion to provide an input pattern V of character vectors and a direct use of the input pattern V at the matching section 96 for a comparison with the held reference patterns Wa to check up for a match with the input pattern V.

However, even in such an adaptive operation, the conventional system is still subjected to a degradation of recognition performance due to temporal variations in utterance environment.

The present invention has been achieved with such points in mind.

SUMMARY OF THE INVENTION

It is therefore an object of the present invention to provide a speech recognition method and a speech recognition system permitting a quick response for adaptation to a temporal variation of utterance environment, as well as an effective reduction of average recognition time.

To achieve the object, a genus of the present invention provides a speech recognition method comprising the steps of storing a set of first patterns of which a respective one represents a set of characters of a corresponding one of a set of recognition objects in a first utterance environment, converting an input speech representative of an uttered speech in a second utterance environment into a second pattern representative of a set of characters of the input speech, estimating a magnitude of an environmental difference between the first and second utterance environments, checking the set of first patterns for a first match with the second pattern, as the magnitude of the environmental difference does not exceed a first threshold, outputting a recognition result representative of one of the set of recognition objects corresponding to the first match, compensating at least one of the set of first patterns and the second pattern to effect a cancellation of the environmental difference, as the magnitude of the environmental difference exceeds the first threshold, so that a set of third patterns and a fourth pattern represent the set of first patterns and the second pattern, respectively, checking the set of third patterns for a second match with the third pattern, and outputting a recognition result representative of one of the set of recognition objects corresponding to the second match.

According to the genus of the invention, speech recognition is achieved by a combination of a primary matching between a set of first patterns and a second pattern, as a magnitude of an environmental difference does not exceed a threshold, and a secondary matching between a set of third patterns and a fourth pattern, as the magnitude of the environmental difference exceeds the threshold, so that the secondary matching is performed if and only when the magnitude of the environmental difference exceeds the threshold and is not always needed, thus resulting in a reduced average recognition time and a possible response for adaptation to a variation of utterance environment.

Moreover, according to the genus of the invention, an intended object is achieved by a combination of a primary matching and a secondary matching, without needing extra troublesome provisions for a modification of a conventional system.

According to a species of the genus of the invention, said estimating the magnitude of the environmental difference comprises the steps of comparing the second pattern with the set of first patterns to check for a third match therebetween, as it substitutes for the first match unless the magnitude of the environmental difference exceeds the first threshold, generating information on a componentwise correspondence relation between the first pattern and one of the set of first patterns corresponding to the third match, and responding to the information for processing the first and second patterns to estimate the magnitude of the environmental difference.

According to another species of the genus of the invention, the set of third patterns represents the set of first patterns, as it is compensated, and said storing the set of first patterns comprises holding the set of third patterns.

According to this species of the invention, a magnitude of a temporal variation of an utterance environment of an input speech is estimated in conjunction with a combination of a primary matching to be effected unless the magnitude of the temporal variation exceeds a threshold and a secondary matching to be effected if and only when the magnitude of the temporal difference exceeds the threshold, thus permitting a quick response for adaptation to the temporal variation of the utterance environment of the input speech.

To achieve the object, another genus of the present invention provides a speech recognition method comprising the steps of storing a set of first patterns of which a respective one represents a set of characters of a corresponding one of a set of recognition objects in a first utterance environment, converting an input speech representative of an uttered speech in a second utterance environment into a second pattern representative of a set of characters of the input speech, estimating a magnitude of an environmental difference between the first and second utterance environments, checking the set of first patterns for a match with the second pattern, as the magnitude of the environmental difference does not exceed a first threshold or exceeds a second threshold, outputting a recognition result representative of one of the set of recognition objects corresponding to a matching one of the set of first patterns, compensating at least one of the set of first patterns and the second pattern to effect a cancellation of the environmental difference, as the magnitude of the environmental difference exceeds the first threshold and does not exceed the second threshold, so that a set of third patterns and a fourth pattern represent the set of first patterns and the second pattern, respectively, checking the set of third patterns for a match with the third pattern, and outputting a recognition result representative of one of the set of recognition objects corresponding to a matching one of the set of third patterns.

According to this genus of the invention, there is permitted an effective speech recognition when an input speech comprises irregular noises and/or includes none of stored recognition objects.

To achieve the object, another genus of the present invention provides a speech recognition method for a comparison between an input pattern representative of characters of an input speech and a reference pattern stored in advance to effect a speech recognition, the method including the steps of estimating a magnitude of a variation of an utterance environment of the input speech, checking for a match between the input and reference patterns, as the magnitude of the variation is smaller than a predetermined threshold, compensating one of the input pattern and the reference pattern, as the magnitude of the variation is larger than the predetermined threshold, so that the input and reference patterns match with each other in terms of the utterance environment, and re-checking for a match between the matching input and reference patterns.

To achieve the object, another genus of the present invention provides a speech recognition method for a comparison between an input pattern representative of characters of an input speech and a reference pattern stored in advance to effect a speech recognition, the method including the steps of estimating a magnitude of a variation of an utterance environment of the input speech, checking for a match between the input and reference patterns, as the magnitude of the variation is smaller than a first threshold or larger than a second threshold, compensating one of the input pattern and the reference pattern, as the magnitude of the variation is larger than the first threshold and smaller than the second threshold, so that the input and reference patterns match with each other in terms of the utterance environment, and re-checking for a match between the matching input and reference patterns.

Moreover, to achieve the object described, another genus of the present invention provides a speech recognition system comprising a primary matching means for effecting a comparison between a first pattern held in advance as a reference pattern and a second pattern representative of characters of an input speech to have a primary correspondence defined therebetween, a pattern compensating means for compensating at least one of the first and second patterns for a match of an utterance environment of the input speech so that the first pattern and the second pattern are represented by a third pattern and a fourth pattern, respectively, a secondary matching means operable for a comparison between the third and fourth patterns to have a secondary correspondence defined therebetween, an environmental variation detecting means for detecting a variation of the utterance environment, and a control means responsible for a degree of the detected variation of the utterance environment to make a decision for or against operating the secondary matching means.

According to this genus of the invention, a degree of a variation of an utterance environment of an input speech is detected to be based on, when the degree is relatively large, for a decision that the utterance environment has a large difference relative to a previous state thereof, to compensate a reference pattern and/or an input pattern for a match of the utterance environment before entering a secondary matching for a comparison between the input and reference patterns, as they are compensated as necessary, to output a final recognition result.

If the degree of the variation of the utterance environment is relatively small, the secondary matching is omitted, thus permitting a primary matching for a comparison between the input pattern and a reference pattern, as it is compensated in a previous speech recognition, to output a final recognition result.

Therefore, the secondary matching is not always needed, thus resulting in a reduced average recognition time, as well as an effective compensation of the utterance environment even where the utterance environment varies with time.

To achieve the object, another genus of the present invention provides a speech recognition system comprising a reference pattern memory means for holding a first pattern prepared in advance on the basis of reference speeches so as to represent characters of recognition objects, an analyzing means for analyzing an input speech to determine a second pattern representative of characters of the input speech, a primary matching means for calculating a first distance between the first and second patterns to determine a primary recognition object of which the first distance is minimum, a compensatory value calculation means for calculating compensatory values for a pattern compensation to obtain a match of an utterance environment of the input speech, a pattern compensating means responsible for the compensatory values to compensate at least one of the first and second patterns so that the first pattern and the second pattern are represented by a third pattern and a fourth pattern, a secondary matching means operable for calculating a second distance between the third and fourth patterns to determine a secondary recognition object of which the second distance is minimum, an environmental variation detection means responsible for the compensatory values to determine an environmental variation index representative of a magnitude of a variation of the utterance environment, and a control means responsible for the environmental variation index to make a decision for or against operating the secondary matching means.

According to this genus of the invention, an environmental variation index can be determined simply from compensatory values employed for a match of an utterance environment.

According to a species of this genus of the invention, the control means is responsive to the environmental variation index, as it exceeds a first threshold, to make the decision for operating the secondary matching means, and to that, as it does not exceed the first threshold, to make the decision against operating the secondary matching means.

According to this species of the invention, the degree of a variation of an utterance environment can be decided based upon whether an environmental variation index exceeds a predetermined threshold.

According to an embodiment of this species of the invention, the control means has a second threshold larger than the first threshold, and is responsive to the environmental variation index, as it exceeds the second threshold, to make the decision against operating the secondary matching means.

According to the same embodiment of the invention, even where a predetermined threshold is exceeded, a decision for entering a secondary matching is controllable with another threshold larger than the former so that the secondary matching is omitted if the latter is exceeded, thus preventing an erroneous recognition such as of irregular noises or for a recognition object other than listed in a stored dictionary.

BRIEF DESCRIPTION OF THE DRAWINGS

The objects, features and advantages of the present invention will become more apparent from consideration of the following detailed description, taken in conjunction with the accompanying drawings, in which.

DESCRIPTION OF THE PREFERRED EMBODIMENTS

There will be detailed below preferred embodiments of the present invention, with reference to FIGS. 4 to 7. Like elements of the foregoing description will be defined by like characters.

Figure 4:
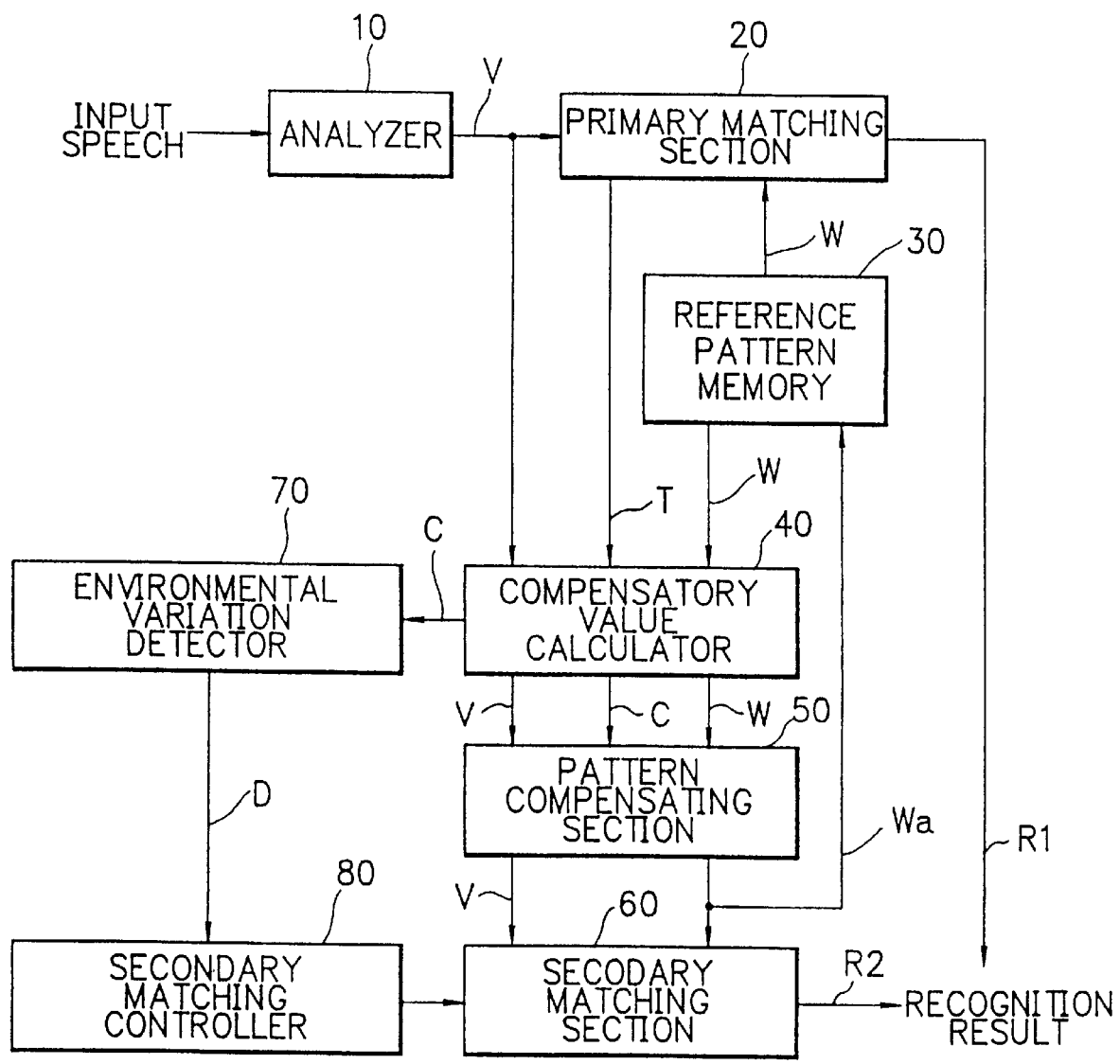
FIG. 4 is a block diagram of an essential part of a speech recognition system according to an embodiment of the invention.

FIG. 4 is a block diagram of an essential part of a speech recognition system according to an embodiment of the invention.

This speech recognition system comprises an analyzer 10 for analyzing an input speech to provide an input pattern V representative of characters of the input speech, a reference pattern memory 30 for holding a collective reference pattern W prepared on the basis of reference speeches so as to represent characters of recognition objects, a primary matching section 20 for calculating a distance between the input pattern V and the reference pattern W to determine a recognition object minimal of thus calculated distance, a compensatory value calculator 40 for calculating compensatory values C employable in compensation of the reference pattern W for a match of an utterance environment, a pattern compensating section 50 responsible for the compensatory values C to compensate the reference pattern W for the match to provide a compensated reference pattern Wa, a secondary matching section 60 operable for calculating distances between the input pattern V and the compensated pattern Wa to determine a recognition object minimal of thus calculated distance, an environmental variation detector 70 responsible for the compensatory values C to determine an environmental variation index D representative of a magnitude of a variation of the utterance environment, and a secondary matching controller 80 responsible for the environmental variation index D to make a decision for or against operating the secondary matching section 60.

At the analyzer 10 analyzing the input speech, the input pattern V is determined as a temporal series of vectors representative of the characters of the input speech in accordance with a well-known Mel-Cepstrum analysis that is a Cepstrum analysis in which a spectral envelope and a fine structure are separated in a frequency region by way of an approximation.

For this purpose, there may be employed other known analyses such as a spectral analysis and a linear predictive analysis.

The primary matching section 20 normalizes temporal axes of the input pattern V and the reference pattern W, which has been prepared on the basis of the reference speeches to be representative of the characters of the recognition objects as described and is read therefrom, and calculates the distance between the input and reference patterns V and W, as they are defined on a normalized temporal axis, to thereby select the recognition object that has the minimum distance, so that an id of the selected recognition object is output as a recognition result R1 of the section 20.

Concurrently, there is obtained information on a correspondence relation T between a temporal sequence of character vectors of the input pattern V and a temporal sequence of character vectors of a basic reference pattern of the selected recognition object, as their temporal axes are normalized.

The primary matching section 20 employs a known DP matching concept for the calculation of the distance after the normalization of temporal axes, as well as for having a defined correspondence between the input pattern V and the reference pattern W.

For this purpose, there may be employed other known concepts such as by use of an HMM model.

The compensatory value calculator 40 responds to a combination of the input pattern V, the reference pattern W and the information on the correspondence relation T between the temporal sequences of the character vectors respectively of the input pattern V and a corresponding reference pattern to the selected recognition object, for calculating a combination of an average power level Sv over utterance intervals and an average power level Nv over noise intervals for a respective one of spectral components of the input pattern V and a combination of an average power level Sw over utterance intervals and an average power level Nw over noise intervals for a respective one of spectral components of the reference pattern W to execute the processes of expressions (17) to (19), thereby determining the compensatory values C including component values of a distortion ratio vector Av/Aw, an additive noise vector Bv of the input pattern V and an additive noise vector Bw of the reference pattern W.

The component values may be each determined as an arithmetic mean or a geometric mean on a corresponding spectrum.

The compensatory values C are input to the pattern compensating section 50 and the environmental variation detector 70.

The pattern compensating section 50 is responsible for the input compensatory values C as Av/Aw, Bv and Bw to apply processes of expressions (15) and (16) for compensating the reference pattern W to have an utterance environment thereof match to the utterance environment of the input speech so that the compensated reference pattern Wa substantially represents a set of character-vector patterns of the recognition objects, as they are uttered in the same utterance environment as the input speech.

The compensated reference pattern Wa is input on the one hand to the secondary matching section 60, and on the other hand to the reference pattern memory 30, where it is stored as a new reference pattern W.

The compensated reference pattern Wa may be simply held in the reference pattern memory 30, to be read therefrom for use in the secondary matching section 60.

The secondary matching section 60 is operative for comparing the input pattern V with the compensated reference pattern Wa to select one of the recognition objects corresponding to a basic pattern having a minimum distance relative to the input pattern V, like the primary matching section 20, so that an id of the selected recognition object is output as a recognition result R2.

The environmental variation detector 70 is responsible for the input compensatory values C as Av/Aw, Bv and Bw to apply processes of later-described expressions (20) to (23) for determining the environmental variation index D representative of a degree or magnitude of a temporal variation of the utterance environment.

There will be detailed below a calculation to determine the environmental variation index D in dependence on the compensatory component values C of vectors Av/Aw, Bv and Bw obtained by expressions (17) to (19) in the present embodiment.

First, for elimination of the influence of magnitude of speech on a ratio of distortions of the input and reference patterns, the distortion ratio vector Av/Aw is converted into a normalized distortion ratio vector E to a unit norm by expression (20), such that:

$$E = (Av/Aw)/\langle\langle Av/Aw\rangle\rangle \quad (20),$$

where $\langle\langle \ \rangle\rangle$ means a norm.

Accordingly, unless the utterance environment is varied from a previous state, the normalized distortion ratio vector is equivalent to a unit vector U having a set of identical components and a norm of unity.

Then, a distance between the normalized distortion ratio vector E and the unit vector U is determined as a variation Da of distortion by expression (21), such that:

$$Da = \langle\langle E - U \rangle\rangle \quad (21)$$

which is null if the environment remains unchanged.

On the other hand, a distance between the additive noise vector Bv of the input pattern V and the additive noise vector Bw of the reference pattern is determined as a variation Db of additive noise by expression (22), such that:

$$Db = \langle\langle Bv - Bw \rangle\rangle \quad (22)$$

The environmental variation index D is determined as a sum of the distortion variation Da multiplied by a weighting factor of a and the additive noise variation Db multiplied by a weighting factor of $1-\alpha$, such that:

$$D = \alpha Da + (1-\alpha)Db \quad (23),$$

where $\alpha$ is a variable coefficient, such that $0<\alpha<1$, for a normalization of the distortion variation Da different in value from the additive noise variation Db.

As will be seen from expression (23), the environmental variation index D has a relatively small positive value if the variation of the utterance environment is small, and has a relatively large positive value if the variation of the utterance environment is large.

It will be understood that the environmental variation index may be otherwise defined. For example, the distortion variation Da or the additive noise variation Db may be solely employed or the normalized distortion ratio vector E may be cosine-transformed to have a component-reduced vector, which may be substituted for the normalized distortion ratio vector E in calculations of expressions (21) to (23) to provide a result as an environmental variation index.

The environmental variation index D, as it is determined by expression (23), is input to the secondary matching controller 80, which responds thereto to make a decision as to whether or not the secondary matching section 60 should be operated as described.

More specifically, unless the environmental variation index D is larger than a threshold th as a criterion for the decision, it is concluded that the environmental variation is small, thus causing the system to output as a final the recognition result R1 of the primary matching section 20, without entering a secondary matching.

If the environmental variation index D is larger than the threshold, it is then concluded that the environmental variation is large, causing the system to output as a final the recognition result R2 of the secondary matching section 60.

For the decision of a degree of the environmental variation, there may be employed another threshold th2 larger than the above-mentioned threshold th.

In this case, if the environmental variation index D is larger than the threshold th2, the system may conclude that the input speech might be irregular noises or other than the recognition objects, rejecting a recognition result, as it might be low of reliability, outputting the effect to avoid making a pattern compensation.

A decision on comparison of magnitude between the environmental variation index D and the threshold th2, it may be prevented for a temporal environmental variation to have influences on a subsequent speech recognition or it may be informed to an uttering person that a current utterance environment might be inadequate for a speech recognition, thus permitting a speech recognition with an increased stability, ensuring a high-quality speech recognition.

Figure 5:
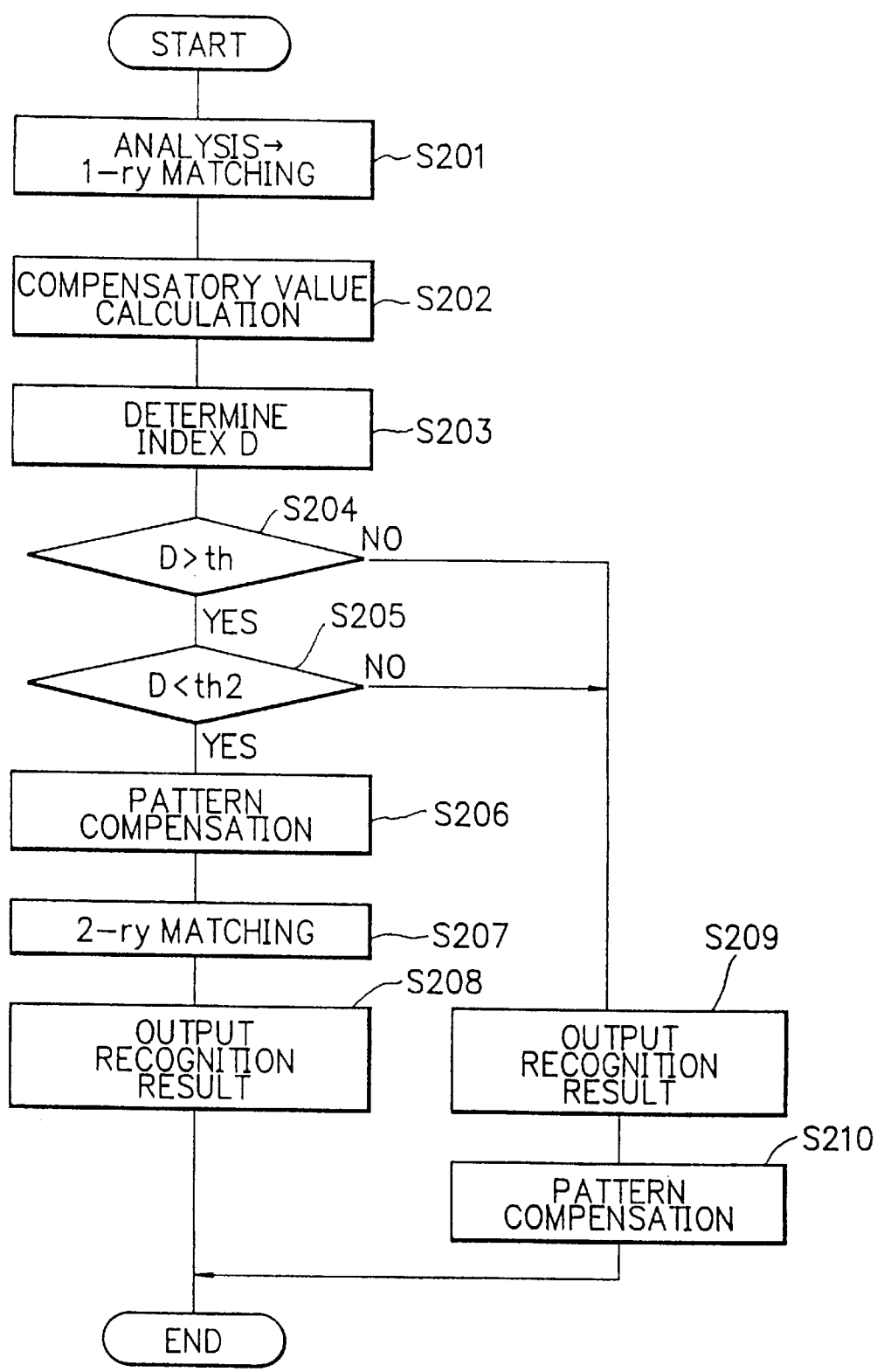
FIG. 5 is a flow chart of actions associated with a speech recognition of the system of FIG. 4.

FIG. 5 is a flow chart of actions associated with a speech recognition of the system of FIG. 4, as it has a second threshold th2 and a compensated reference pattern Wa may be read from the reference pattern memory 30 into the secondary matching section.

With an utterance start of an input speech, the analyzer 10 enters an analysis process to provide an input pattern V as a temporal sequence of character vectors of the input speech.

Concurrently, at a step S201, the primary matching section 20 executes a primary matching process for a first match between the input pattern V, as it is analyzed by the analyzer 10, and a reference pattern W, as it is read from the reference pattern memory 30 where it has been held, to provide information on a correspondence relation T between temporal sequences of character vectors of the input and reference patterns V and W.

Then, at a step S202, the compensatory value calculator 40 performs its process to determine compensatory values C as component values of vectors Av/Aw, Bv and Bw based on a combination of the input pattern V, as it is analyzsed by the analyzer 10, a reference pattern W, as it is read from the reference pattern memory 30 where it has been held, and the information on the temporal sequence correspondence relation T, as it is input from the primary matching section 20.

At a step S203, as the compensatory values C are determined by the compensatory value calculator 40, the environmental variation detector 70 determines an environmental variation index D in accordance with expression (23) or the like.

The secondary matching controller 80 is responsible for the environmental variation index D, as it is determined by the environmental variation detector 70, to control the secondary matching section 60 as follows.

First, at steps S204 and S205, if the environmental variation index D is larger (YES) than a first threshold th and smaller (YES) than a second threshold th2 higher than the first threshold th, then the flow goes to a step S206, where the pattern compensating section 50 employs the componentwise compensatory values C, as they are determined by the compensatory value calculator 40, for compensating the reference pattern W to have a match with an utterance environment of the input speech, so that a compensated reference pattern Wa is output to the secondary matching section 60 and the reference pattern memory 30, where it is stored as a subsequent reference pattern. The compensated reference pattern Wa might not be directly input to the secondary matching section 60, and may be simply stored in the reference pattern memory 30, to be read therefrom into the secondary matching section 60.

Upon completion of the step S206 by the pattern compensating section 50, the flow goes to a step S207, where the secondary matching section 60 executes a secondary matching process for a second match between the input pattern V, as it is analyzed, and the reference pattern Wa, as it is compensated and input from the pattern compensating section 50 or may be read from the reference pattern memory 30, to provide a recognition result R2.

Then, at a step S208, the recognition result R2 obtained by the secondary matching process is output as a final, before the flow goes to an end.

On the other hand, if the decisions at the steps S204 and S205 are either or both NO, the flow detours the steps S206 to S208, going to a step S209, where the recognition result R1 obtained by the primary matching process at the step S201 is output as a final.

Upon completion of the step S209, the flow goes to the end, or may go to a step S210, where the compensatory values C determined by the compensatory value calculator 40 at the step S202 may be employed to compensate the reference pattern so that a compensated reference pattern Wa may be employed for an effective primary matching in a subsequent speech recognition..

Therefore, according to the flow chart of FIG. 5, the secondary matching process is omitted if the environmental variation index D is small, thus effectively reducing recognition time, upgrading the quality of a subsequent speech recognition.

Figure 1:
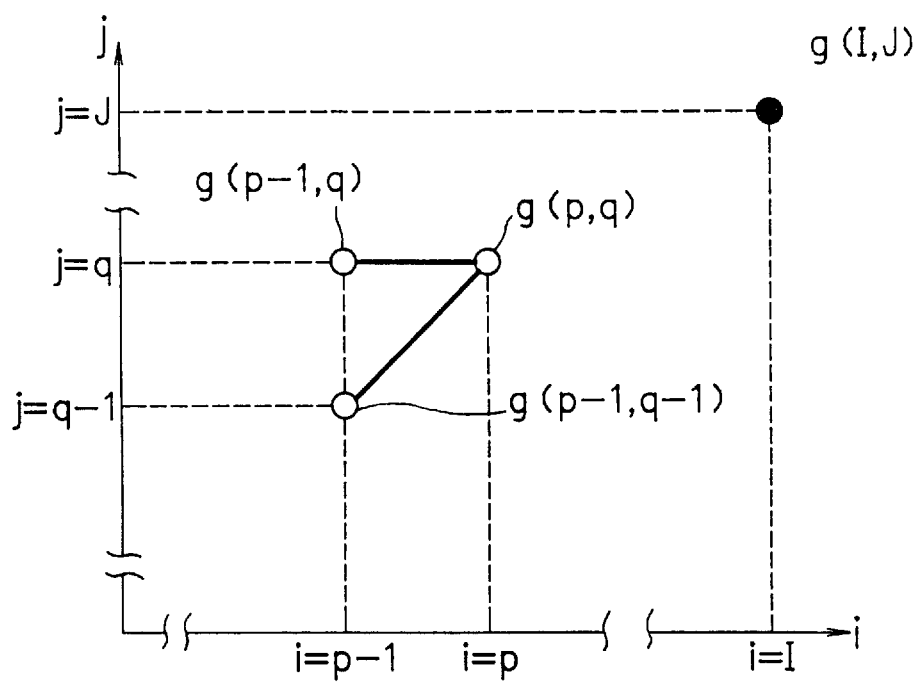
FIG. 1 is a graph of an i–j plane for describing a fundamental speech recognition concept.

There will be detailed below a timing of each process and a recognition time of the system of FIG. 4 according to the embodiment of the invention, including a comparison with the conventional system FIG. 1.

Figure 2:
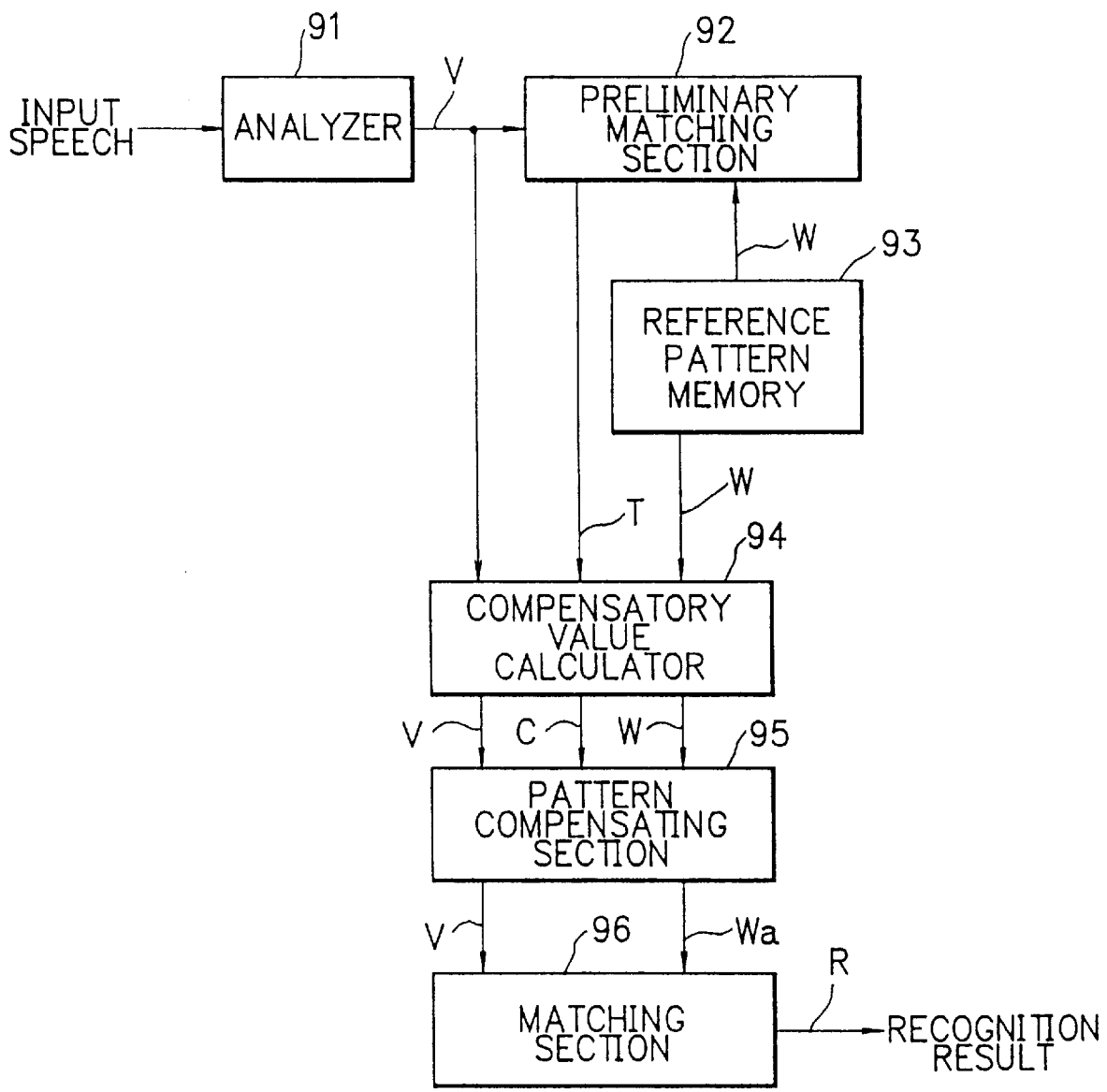
FIG. 2 is a block diagram of an essential part of a conventional speech recognition system.
Figure 3:
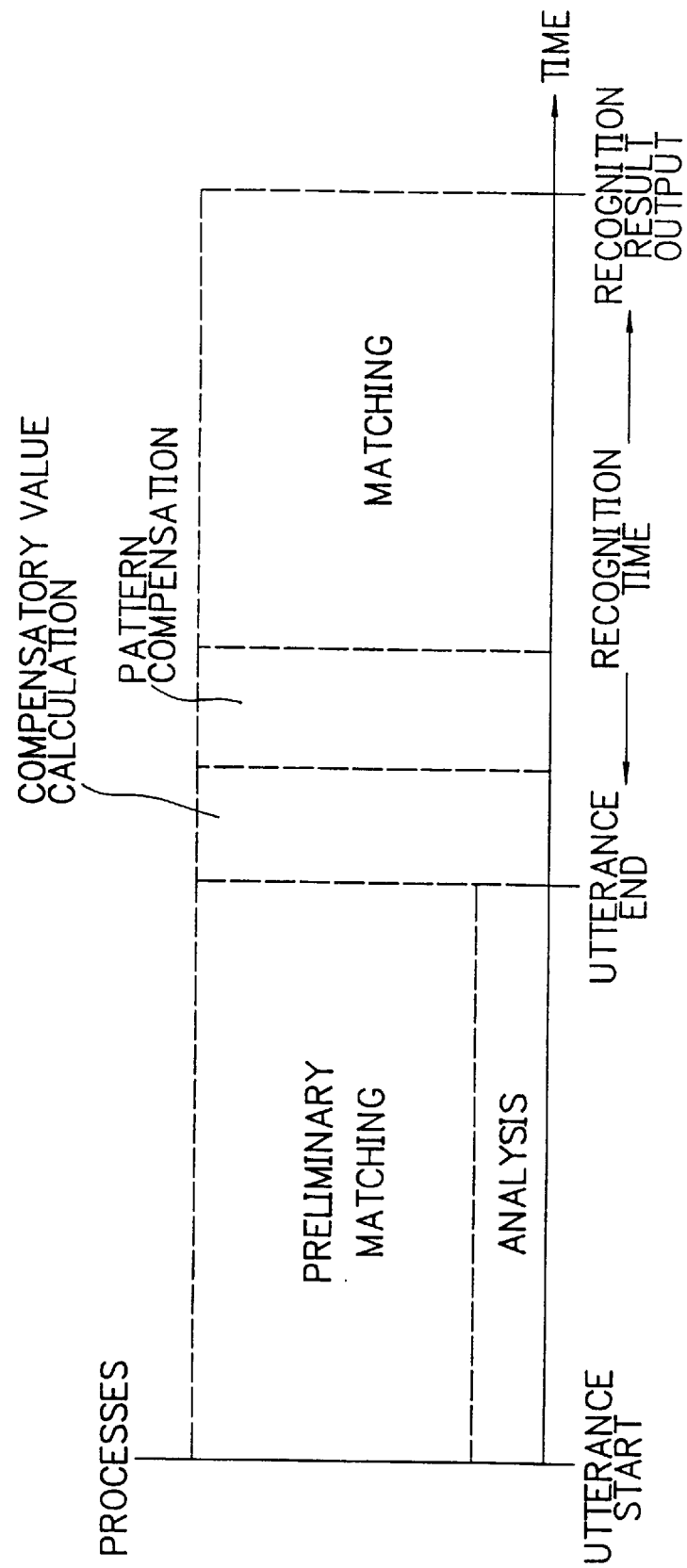
FIG. 3 is a time chart of actions of the conventional speech recognition system of FIG. 2.

As shown in FIGS. 2 and 3, in the conventional speech recognition system, an analysis process at the analyzer 91 and a preliminary matching process at the preliminary matching section 92 concurrently start when an utterance of an input speech is commenced, and run in parallel until an utterance end of the input speech, where they both come to an end, providing a correspondence relation T between temporal sequences of character vectors and a recognition result of the preliminary matching process.

Upon completion of the preliminary matching process, the compensatory value calculator 94 starts a compensatory value calculation process to provide compensatory values C.

With the compensatory values C given, the pattern compensating section 95 starts a pattern compensation process for compensating a reference pattern W.

Following the compensation of the reference pattern W, the matching section 96 starts a matching process to provide a recognition result.

Accordingly, the conventional system of FIG. 2 has a recognition time equivalent to a sum of a compensatory value calculation time, a pattern compensating process time and a matching process time.

Figure 6:
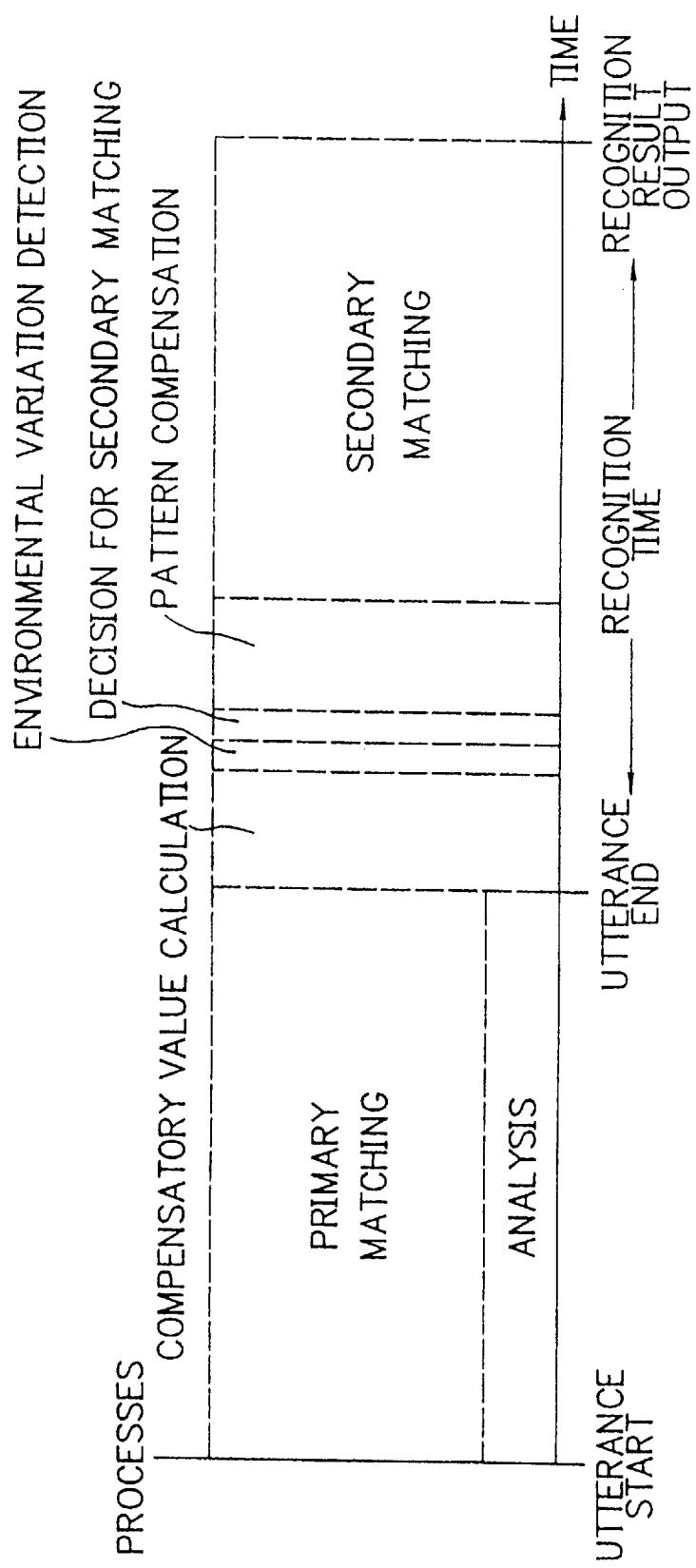
FIG. 6 is a time chart for describing a relationship between a secondary matching and a recognition time in the system of FIG. 4.

FIG. 6 shows a timing of each process and a recognition time of the speech recognition system according to the present embodiment, as the secondary matching process is executed in response to a relatively large variation of an utterance environment.

As shown in FIGS. 4 and 6, in the speech recognition system according to the embodiment, an analysis process (analogous to the conventional analysis process) at the analyzer 10 and a primary matching process (analogous to the conventional preliminary matching process) at the primary matching section 20 concurrently start when an utterance of an input speech is commenced, and run in parallel until an utterance end of the input speech, where they both come to an end, providing a correspondence relation T between temporal sequences of character vectors and a recognition result R1 of the primary matching process.

After the primary matching process, the compensatory value calculator 40 starts a compensatory value calculation process (analogous to the conventional compensatory value calculation process) to provide compensatory values C.

With the compensatory values C given, the environmental variation detector 70 starts an environmental variation detection process to provide an environmental variation index D. With the environmental variation index D given, the secondary matching controller 80 makes a decision on an execution of a secondary matching process.

After the decision on the execution of the secondary matching process, the pattern compensating section 50 starts a pattern compensation process (analogous to the conventional pattern compensation process) for compensating a reference pattern W.

Following the compensation of the reference pattern W, the secondary matching section 60 starts the secondary matching process to provide a recognition result R2 as a final.

Accordingly, the system of FIG. 4 has a recognition time equivalent to a sum of a compensatory value calculation time, an environmental variation detection process time, a secondary matching execution decision time, a pattern compensating process time and a secondary matching process time, as the secondary matching process is executed in response to the large variation of the utterance environment.

Figure 7:
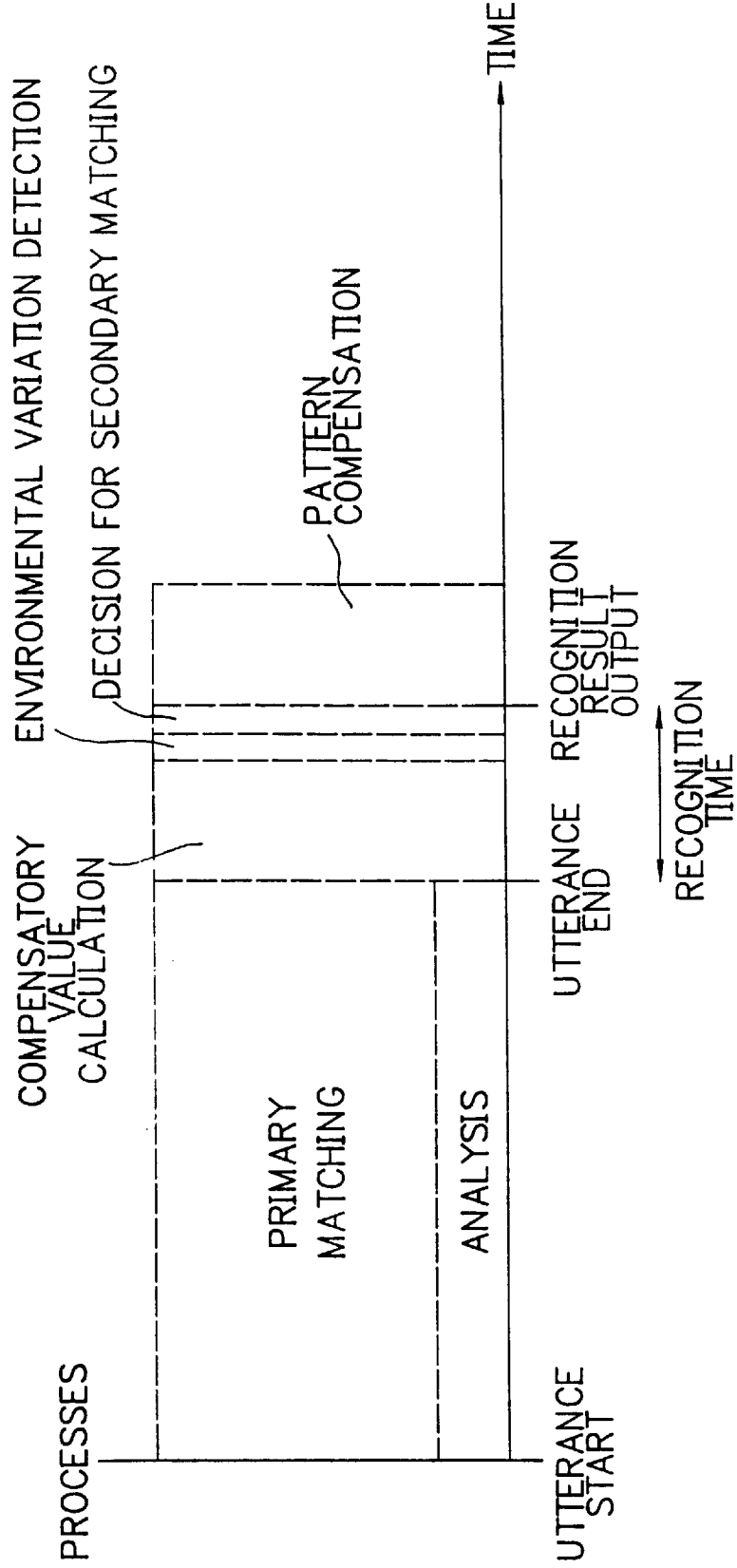
FIG. 7 is a time chart for describing a case in which the secondary matching of FIG. 6 is omitted.

FIG. 7 shows a timing of each process and a recognition time of the speech recognition system according to the present embodiment, as the secondary matching process is omitted in response to a relatively small variation of an utterance environment.

As shown in FIGS. 4 and 7, also in this case in which the secondary matching process is omitted because of the small variation of the utterance environment, like processes to the case of FIG. 6 are executed until the secondary matching controller 80 makes a decision on an execution of the secondary matching process.

However, after the decision on the execution of the secondary matching process, there is output as a final the recognition result Ri of the primary matching process at the primary matching section 20.

After the recognition result RI is output, the pattern compensating section 50 starts a pattern compensation process for compensating a reference pattern W.

The pattern compensation process is a final process so that the flow comes to an end upon completion of this process. The recognition results RI is obtained before the pattern compensation process.

Accordingly, the system of FIG. 4 has a recognition time equivalent to a sum of a compensatory value calculation time, an environmental variation detection process time and a secondary matching execution decision time, as the secondary matching process is omitted in response to the small variation of the utterance environment.

The foregoing recognition times will be quantitatively described by using practical process times.

It is now assumed that, with a speech of 1-sec. utterance input, a speech recognition system according to the embodiment takes 0.8 sec. for a secondary matching process, 0.01 sec. for a compensatory value calculation process, 0.001 sec. for an environmental variation detection process, 0.0001 sec. for a decision on an execution of the secondary matching process, and 0.19 sec. for a pattern compensation process.

Assuming the time of the secondary matching process be equivalent to that of the conventional matching process, the conventional speech recognition system might have a recognition time of 1 sec. (=0.01+0.19+0.8).

To this point, the speech recognition system according to the embodiment has a recognition time of 1.0011 sec. (=0.01+0.001+0.0001+0.19+0.8) in the case of FIG. 6 in which the secondary matching process is executed, but has a recognition time of 0.0111 sec. (=0.01+0.001+0.0001) in the case of FIG. 7 in which the secondary matching process is omitted.

If the utterance environment has a large variation once per ten utterances, it then so follows that the speech recognition system according to the embodiment has an average recognition time of 0.11 sec. {=1.0011 sec.×(1/10)+0.0111×(9/10)}, achieving a reduction of approx. 0.89 sec. in comparison with a conventional 1.0011 sec.

As will be seen from the foregoing description, according to the present embodiment, the degree of a variation of utterance environment is defined as a magnitude of an environmental variation index D determined by an environmental variation detector 70 so that a secondary matching section 60 is controlled by a secondary matching controller 80 so as to execute a secondary matching process if and only when the index D exceeds a threshold th, thus permitting an effective compensation of an utterance environment even with a temporal variation of the environment, as well as a remarkable advantage that a recognition time can be greatly reduced.

The foregoing embodiment may be modified in a various manner.

The pattern compensating section 50 may be implemented not always to compensate a reference pattern, but also to compensate an input pattern or both reference pattern and input pattern.

In the case of compensation of an input pattern, the expressions (10) to (13) may be employed for compensating the input pattern to have a match of utterance environment with respect to additive noise and distortion so that similar relationships to the expressions (15) and (16) may be induced for a compensated input pattern Va, while using compensatory values C to be determined by the expressions (17) to (19), like the case of a reference pattern.

Moreover, the reference pattern to be compensated at the pattern compensating section 50 may be read not always from the reference pattern memory 30, but also from a basic reference pattern memory to be additionally provided for storing therein a set of unchangeable basic reference patterns.

In this case, the environmental variation index D may be otherwise determined. For example, a distortion ratio vector and an additive noise vector of an input pattern, as they are used in a previous compensation, may be stored to be read for a current use to have a current distortion ratio vector Av/Aw divided by the previous distortion ratio vector, obtaining a result therefrom as a new distortion ratio vector Av/Aw, and to have the previous additive noise vector as a new additive noise vector Bw of a reference pattern so that the new vectors may be substituted in the expressions (20) to (23) to determine an environmental variation index D.

Further, the primary matching section 20 and the secondary matching section 60 may be combined into a single matching section adapted for a primary matching process and a secondary matching process.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A speech recognition method comprising:

storing a set of first patterns of which a respective pattern represents a set of characters of a corresponding one of a set of recognition objects in a first utterance environment;

converting an input speech representative of a speech uttered in a second utterance environment into a second pattern representative of a set of characters of the input speech;

estimating a magnitude of an environmental difference between the first and second utterance environments checking the set of first patterns for a first match with the second pattern if the magnitude of the environmental difference does not exceed a first threshold;

outputting a recognition result representative of one of the set of recognition objects corresponding to the first match;

compensating at least one of the set of first patterns and the second pattern to effect a cancellation of the environmental difference if the magnitude of the environmental difference exceeds the first threshold, so that a set of third patterns and a fourth pattern represent the set of first patterns and the second pattern, respectively;

checking the set of third patterns for a second match with the third pattern; and outputting a recognition result representative of one of the set of recognition objects corresponding to the second match.

2. A speech recognition method according to claim 1, wherein said estimating the magnitude of the environmental difference comprises:

comparing the second pattern with the set of first patterns to check for a third match therebetween, as it substitutes for the first match unless the magnitude of the environmental difference exceeds the first threshold;

generating information on a componentwise correspondence relation between the first pattern and one of the set of first patterns and corresponding to the third match; and responding to the information for processing the first and second patterns to estimate the magnitude of the environmental difference.

3. A speech recognition method according to claim 1, wherein:

the set of third patterns represents the set of first patterns, as it is compensated; and said storing the set of first patterns comprises holding the set of third patterns.

4. A speech recognition method comprising:

storing a set of first patterns of which a respective pattern represents a set of characters of a corresponding one of a set of recognition objects in a first utterance environment;

converting an input speech representative of a speech uttered in a second utterance environment into a second pattern representative of a set of characters of the input speech;

estimating a magnitude of an environmental difference between the first and second utterance environments;

checking the set of first patterns for a match with the second pattern if the magnitude of the environmental difference does not exceed a first threshold or exceeds a second threshold;

outputting a recognition result representative of one of the set of recognition objects corresponding to a matching one of the set of first patterns;

compensating at least one of the set of first patterns and the second pattern to effect a cancellation of the environmental difference, if the magnitude of the environmental difference exceeds the first threshold and does not exceed the second threshold, so that a set of third patterns and a fourth pattern represent the set of first patterns and the second pattern, respectively;

checking the set of third patterns for a match with the third pattern; and outputting a recognition result representative of one of the set of recognition objects corresponding to a matching one of the set of third patterns.

5. A speech recognition system comprising:

a primary matching means for effecting a comparison between a first pattern held in advance as a reference pattern and a second pattern representative of characters of an input speech to have a primary correspondence defined therebetween;

a pattern compensating means for compensating at least one of the first and second patterns for a match of an utterance environment of the input speech so that the first pattern and the second pattern are represented by a third pattern and a fourth pattern, respectively;

a secondary matching means for comparing the third and fourth patterns to define a secondary correspondence therebetween;

an environmental variation detecting means for detecting a variation of the utterance environment; and a control means for determining whether to operate the secondary matching means in accordance with said variation of the utterance environment.

6. A speech recognition system comprising:

a reference pattern memory means for holding a first pattern prepared in advance on the basis of reference speeches to represent characters of recognition objects;

an analyzing means for analyzing an input speech to determine a second pattern representative of characters of the input speech;

a primary matching means for calculating a first distance between the first and second patterns to determine a primary recognition object of which the first distance is minimum;

a compensatory value calculation means for calculating compensatory values for a pattern compensation to obtain a match of an utterance environment of the input speech;

a pattern compensating means responsive to the compensatory values for compensating at least one of the first and second patterns so that the first pattern and the second pattern are represented by a third pattern and a fourth pattern;

a secondary matching means for calculating a second distance between the third and fourth patterns to determine a secondary recognition object of which the second distance is minimum;

an environmental variation detection means responsive to the compensatory values for determining an environmental variation index representative of a magnitude of a variation of the utterance environment; and a control means responsive to the environmental variation index for determining whether to operate the secondary matching means.

7. A speech recognition system according to claim 6, wherein the control means is responsive to the environmental variation index such that if the environmental variation index exceeds a first threshold, the control means acts to operate the secondary matching means, and if the environmental variation index does not exceed the first threshold, the control means does not act to operate the secondary matching means.

8. A speech recognition system according to claim 7, wherein the control means has a second threshold larger than the first threshold, and wherein the control means is responsive to the environmental variation index such that as the environmental variation index exceeds the second threshold, the control means does not act to operate the secondary matching means.

* * * * *